(12) United States Patent
Chung et al.

(10) Patent No.: US 7,327,425 B2
(45) Date of Patent: Feb. 5, 2008

(54) METHOD OF FORMING AN ALIGNMENT LAYER AND AN OVERCOAT LAYER IN A STACK STRUCTURE ON A SUBSTRATE OF A LIQUID CRYSTAL DISPLAY BY SEPARATING A MIXTURE OF AN ALIGNMENT LAYER MATERIAL FROM AN OVERCOAT LAYER MATERIAL IN A THERMAL CURING TREATMENT

(75) Inventors: Hyun Sang Chung, Suwon-shi (KR); Young Suk Park, Bucheon-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 412 days.

(21) Appl. No.: 11/002,279

(22) Filed: Dec. 3, 2004

(65) Prior Publication Data

US 2005/0134775 A1  Jun. 23, 2005

(30) Foreign Application Priority Data

Dec. 23, 2003 (KR) ............... 10-2003-0095469

(51) Int. Cl.
*G02F 1/1335* (2006.01)
*G02F 1/1333* (2006.01)
*G02F 1/1337* (2006.01)
*G02F 1/1343* (2006.01)

(52) U.S. Cl. ............. 349/124; 349/106; 349/110; 349/114; 349/141

(58) Field of Classification Search ........... 349/106, 349/114, 141, 124
See application file for complete search history.

(56) References Cited

U.S. PATENT DOCUMENTS

| 5,166,125 | A  | * | 11/1992 | Harrison et al. | ........... 503/227 |
|---|---|---|---|---|---|
| 5,166,126 | A  | * | 11/1992 | Harrison et al. | ........... 503/227 |
| 5,598,285 | A  | * | 1/1997 | Kondo et al. | ............... 349/39 |
| 6,069,678 | A  | * | 5/2000 | Sakamoto et al. | ......... 349/141 |
| 6,512,564 | B1 | * | 1/2003 | Yoshida et al. | ............ 349/124 |
| 6,545,736 | B2 | * | 4/2003 | Ashizawa et al. | .......... 349/141 |
| 2001/0015783 | A1 |   | 8/2001 | Ohta et al. | |

FOREIGN PATENT DOCUMENTS

| JP | 361090131 A | * | 5/1986 |
|---|---|---|---|
| JP | 410332921 A | * | 12/1998 |
| JP | 200110021 A | * | 4/2001 |

\* cited by examiner

*Primary Examiner*—Huyen Ngo
(74) *Attorney, Agent, or Firm*—McKenna, Long & Aldridge LLP

(57) ABSTRACT

A method for fabricating an LCD device includes forming an alignment layer and an overcoat layer substantially simultaneously. The method includes, coating a mixture of an alignment layer material and an overcoat layer material on a substrate and at least partially separating the overcoat layer material and the alignment layer material by the curing the mixture.

13 Claims, 5 Drawing Sheets

METHOD OF FORMING AN ALIGNMENT LAYER AND AN OVERCOAT LAYER IN A STACK STRUCTURE ON A SUBSTRATE OF A LIQUID CRYSTAL DISPLAY BY SEPARATING A MIXTURE OF AN ALIGNMENT LAYER MATERIAL FROM AN OVERCOAT LAYER MATERIAL IN A THERMAL CURING TREATMENT

This application claims the benefit of Korean Patent Application No. P2003-95469, filed on Dec. 23, 2003, which is hereby incorporated by reference for all purposes as if fully set forth herein.

BACKGROUND OF THE INVENTION

1. Field of the Invention

The present invention relates to liquid crystal display (LCD) devices. More particularly, the present invention relates to a method for fabricating an In-Plane Switching (IPS) mode LCD device. More particularly still, the present invention relates to a method for fabricating an IPS mode LCD device wherein an alignment layer and an overcoat layer are formed substantially simultaneously.

2. Discussion of the Related Art

As information technology continues to evolve, the demand for, and development of, various types of flat panel display devices (e.g., liquid crystal display (LCD), plasma display panel (PDP), electroluminescent display (ELD), and vacuum fluorescent display (VFD)) increases. Among the various types of flat panel display devices, LCD devices are advantageously lightweight, dimensionally compact, consume relatively low amounts of power during operation, display images at high resolution and high luminance, and can display images on a large-sized screen. Accordingly, LCD devices are widely used, for example, as substitutes for Cathode Ray Tubes (CRTs) and find numerous applications in mobile devices as such notebook computers, portable telephones, and the like, as well as in other application such as televisions and computer monitors.

A typical LCD device includes an LCD panel for displaying images and a driver for supplying driving signals to the LCD panel. The LCD panel generally includes first and second substrates bonded to, but spaced apart from, each to form a cell gap therebetween. The first and second substrates are bonded together by a sealant material and a substantially uniform cell gap is maintained between the bonded substrates by the presence of spacers. A liquid crystal layer is formed within the cell gap between the first and second substrates by injecting liquid crystal material through an injection hole formed in the sealant material and into the cell gap.

Generally, the first substrate (i.e., the TFT array substrate) supports a plurality of gate lines spaced apart from each other at a fixed interval and extending along a first direction, a plurality of data lines spaced apart from each other at a fixed interval and extending along a second direction perpendicular to the first direction so as to cross the plurality of gate lines, a plurality of pixel regions arranged in a matrix pattern defined by crossings of the gate and data lines, a plurality of pixel electrodes arranged within the plurality of pixel regions, and a plurality of thin film transistors connected to the gate lines, the data lines, and the pixel electrodes for switching signals from the data lines to corresponding pixel electrodes in response to signals transmitted from the gate lines. An alignment layer is formed over the first substrate and is rubbed to align the liquid crystal layer in a predetermined manner.

Generally, the second substrate (color filter array substrate) supports a black matrix layer that prevents light from being transmitted in regions corresponding to areas outside the pixel regions of the first substrate, an R/G/B color filter layer for selectively transmitting predetermined wavelengths of light, and a common electrode for producing images. An alignment layer is also formed over the second substrate and is rubbed to align the liquid crystal layer in a predetermined manner.

Upon applying predetermined voltages to the pixel and common electrodes of the LCD panel described above, an electric field, vertically oriented with respect to the first and second substrates, is generated to alter an arrangement of liquid crystal molecules within the liquid crystal layer. Upon altering the arrangement of liquid crystal molecules, light transmittance characteristics of the LCD panel are selectively altered and an image can thus be expressed. The LCD panel described above has a high aperture ratio but undesirably displays images over a narrow range of viewing angles. To solve this problem, In-Plane Switching (IPS) mode LCD devices have been developed, in which common and pixel electrodes are both formed on the first substrate. Accordingly, IPS mode LCD devices generate electric fields oriented parallel to the substrates.

FIG. 1 illustrates a plan view of one pixel of a first substrate in a related art IPS mode LCD device. FIG. 2 illustrates a cross-sectional view of a first substrate and an opposing second substrate taken along line I-I' of FIG. 1.

Referring to FIGS. 1 and 2, a plurality of gate and data lines 12 and 24, respectively, are formed on a first substrate 10a so as to cross each other and define a plurality of pixel regions P. A common electrode line 16 is formed adjacent to, and parallel with, the gate lines 12. A thin film transistor T, including a gate electrode 14, an active layer 20, a source electrode 26, and a drain electrode 28, is formed at a crossing of the gate and data lines 12 and 24, wherein the source electrode 26 extends from the data line 24, and the gate electrode 14 projects from the gate line 12. A pixel electrode 30 is formed within the pixel region P so as to be parallel with the data line 24 and electrically connected to the drain electrode 28. The pixel electrode 30 includes a plurality of first pixel electrode parts and one second pixel electrode part each arranged over the common electrode line 16. The first pixel electrode parts are spaced apart from each other at a fixed interval and extend along a first direction over the first substrate while the second pixel electrode part electrically connects the first pixel electrode parts to each other. Further, a common electrode 17 is formed between, and parallel to, each of the first pixel electrode parts so as to be electrically connected to the common electrode line 16. The common electrode 17 includes a plurality of first common electrode parts arranged between the first pixel electrode parts and extending away from the common electrode line 16 in addition to one second common electrode part electrically connecting the first common electrode parts to each other. Outermost ones of the first common electrode parts within the pixel region P are spaced apart from the data line 24 by a predetermined distance. Additionally, insulating layers 21 are formed between the data and common electrode lines 24 and 16, respectively, and between the common electrode line 16 and the common electrode 17. Lastly, a first alignment layer 60a is formed over the entire surface of the first substrate 10a, including over the pixel electrode 30.

As shown in FIG. 2, the second substrate 10b opposes the first substrate 10a and supports includes a black matrix layer 42, an R/G/B color filter layer 44, an overcoat layer 52, and a second alignment layer 60b. The black matrix layer 42 prevents light from being transmitted in regions corresponding to areas outside the pixel regions of the first substrate 10a and the R/G/B color filter layer 44 dimensionally conforms to the pixel region P and selectively transmits predetermined wavelengths of light. The overcoat layer 52 is formed on the color filter layer 44 to planarize the topography of the color filter layer 44 and to prevent pigments within the color filter layer 44 from diffusing into the liquid crystal layer 50, formed between the first and second substrates 10a and 10b. Lastly, the second alignment layer 60b is formed over the entire surface of the second substrate 10b, including over the overcoat layer 52.

The first and second alignment layers 60a and 60b discussed above align liquid crystal molecules within the liquid crystal layer 50 along predetermined directions and are typically formed of a polymer material such as polyamide, polyimide compound, PVA(Polyvinyl Alcohol), polyamic acid, or a photosensitive material such as PVCH(Polyvinyl-Cinnamate), PSCN(PolysiloxaneCinnamate) or CelCN(CelluloseCinnmate)-based compound. The overcoat layer 52 discussed above is typically formed from any one of a photosensitive resin or an acrylic resin.

Upon driving LCD devices having a common electrode formed over the entire surface of the second substrate, including over the black matrix and color filter layers, an electric field is generated that is vertically oriented with respect to the surface of the first and second substrates. Accordingly, the common electrode is functionally equivalent to the overcoat layer 52 illustrated in FIG. 2. However, upon driving IPS mode LCD devices, an electric field is generated that is parallel to the surface of the first and second substrates. Because the common electrode 17 is formed on the first substrate 10, it is necessary to form the overcoat layer 52 on the second substrate 10b.

A related art method for fabricating the second substrate 10b shown in FIG. 2 will now be described in greater detail with respect to FIGS. 3A to 3C.

Referring to FIG. 3A, a light-shielding layer is deposited on the second substrate 10b and selectively removed in regions corresponding to the pixel regions P (i.e., patterned) to form the black matrix layer 42. Next, photosensitive layers (not shown) are repeatedly deposited over the entire surface of the second substrate 10b, including over the black matrix layer 42, and patterned to remain within predetermined portions of the pixel regions P to form the R/G/B color filter layer 44. After the color filter and black matrix layers 44 and 42 are formed, a cleaning process is performed to remove foreign materials from the second substrate 10b.

Referring to FIG. 3B, a photosensitive resin or acrylic resin is coated (i.e., spin coated) over the entire surface of the second substrate 10b, including over the color filter and black matrix layers 44 and 42. The coated resin is then cured to form the overcoat layer 52.

Referring to FIG. 3C, after forming the overcoat layer 52, a polymer material such as polyamide, polyimide compound, PVA(Polyvinyl Alcohol), polyamic acid, or a photosensitive material such as PVCH(PolyvinylCinnamate), PSCN(PolysiloxaneCinnamate) or CelCN(CelluloseCinnmate)-based compound is coated (i.e., spin coated) over the entire surface of the second substrate 10b, including over the overcoat layer 52, cured, and rubbed or irradiated with light to form the second alignment layer 60b.

Fabricating the related art IPS mode LCD device as described above, however, is disadvantageous because the overcoat layer and the second alignment layer must be formed using separate coating (i.e., spin-coating) processes. The necessity for separate process steps undesirably increases the fabrication time and cost. Further, the minimum thickness of each of the overcoat and second alignment layers is determined by the characteristics of the coating processes (i.e., spin-coating processes) by which they are formed. Therefore, the combined thickness of the overcoat and second alignment layers can become undesirably thick and disadvantageously reduce the light transmittance characteristics of the IPS mode LCD device.

SUMMARY OF THE INVENTION

Accordingly, the present invention is directed to a method for fabricating an IPS mode LCD device that substantially obviates one or more of the problems due to limitations and disadvantages of the related art.

An advantage of the present invention provides a method for fabricating an IPS mode LCD device wherein a second alignment layer and an overcoat layer are formed substantially simultaneously, beneficially decreasing the fabrication time and cost.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method for fabricating a LCD device may, for example, include coating a mixture over a substrate, wherein the mixture contains an alignment layer material, suitable for forming an alignment layer, and an overcoat layer material, suitable for forming an overcoat layer, on a substrate; and curing the mixture wherein, upon curing, the overcoat layer material and the alignment layer material at least partially separate from within the mixture to substantially simultaneously form an overcoat layer and an alignment layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
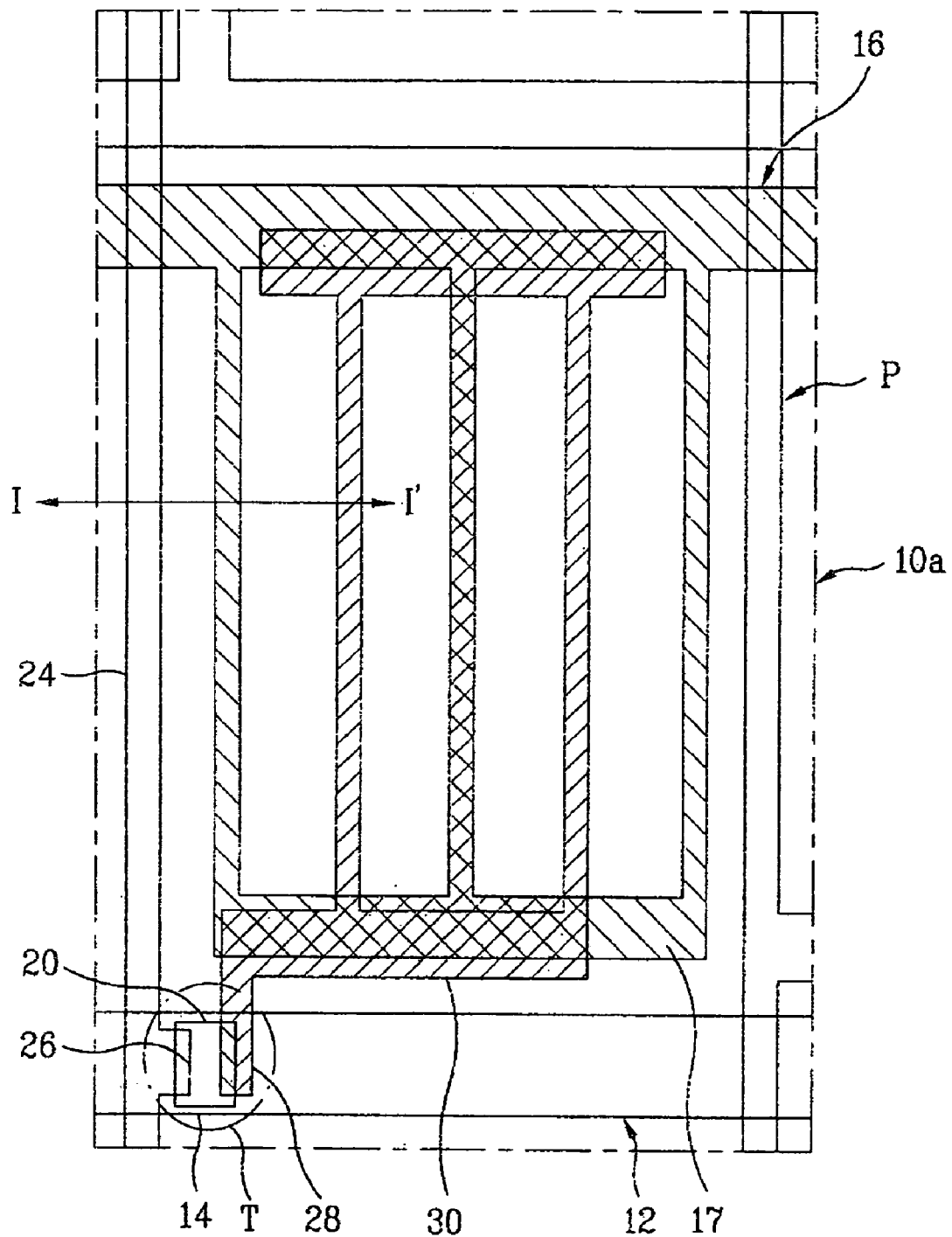
FIG. 1 illustrates a plan view of one pixel of a first substrate in a related art IPS mode LCD device.
Figure 2:
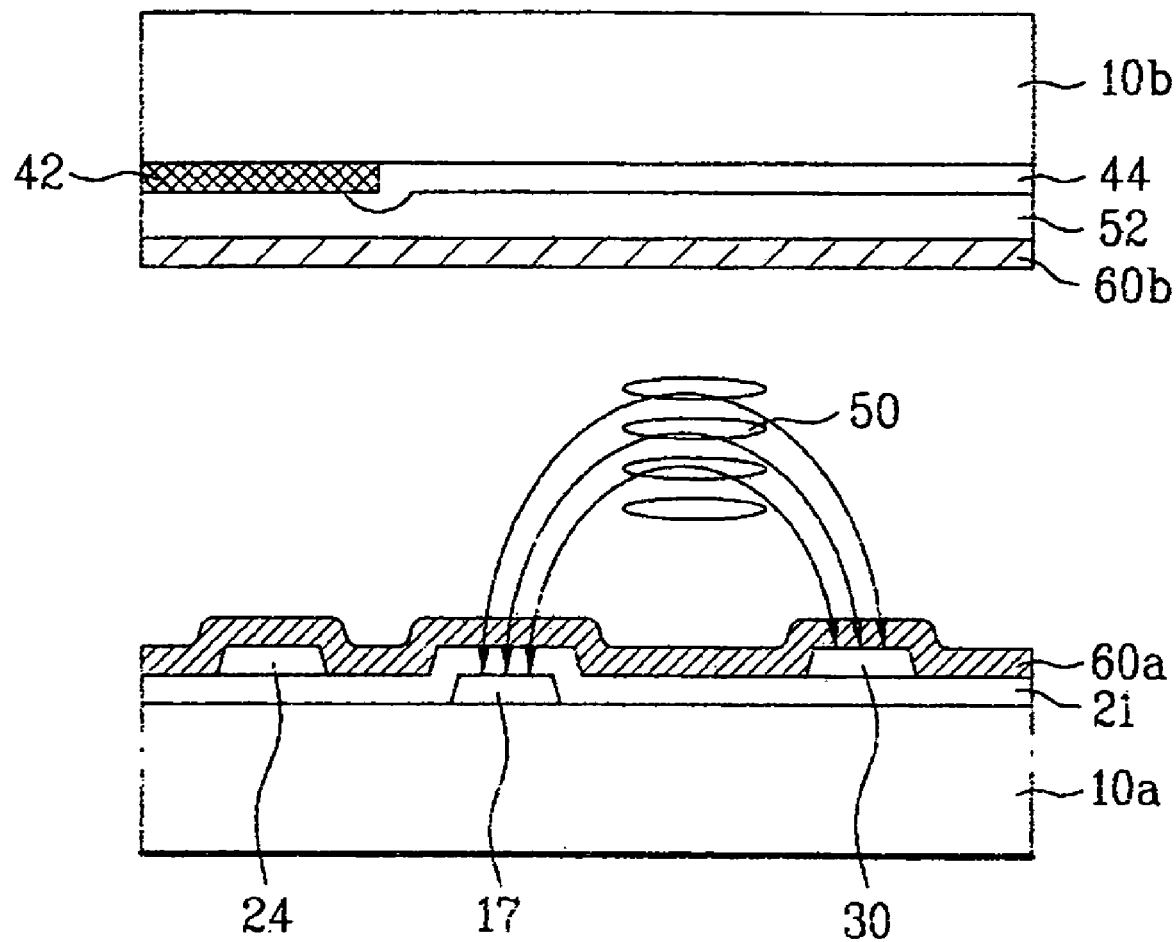
FIG. 2 illustrates a cross-sectional view of a first substrate and an opposing second substrate taken along line I-I' of FIG. 1.
Figure 3A:
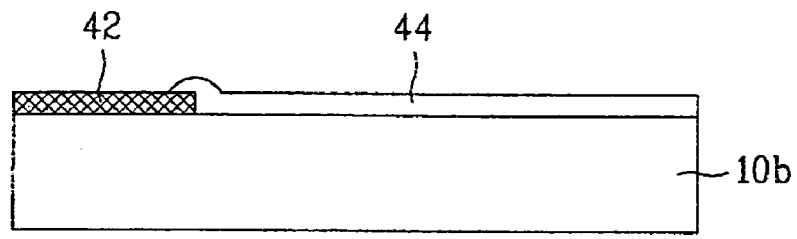
FIGS. 3A to 3C illustrate a related art process of fabricating an IPS mode LCD device.
Figure 3B:
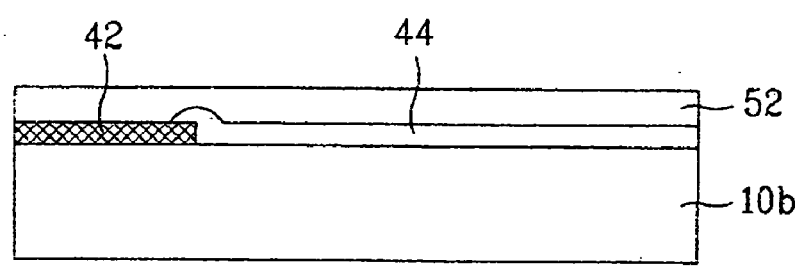
Figure 3C:
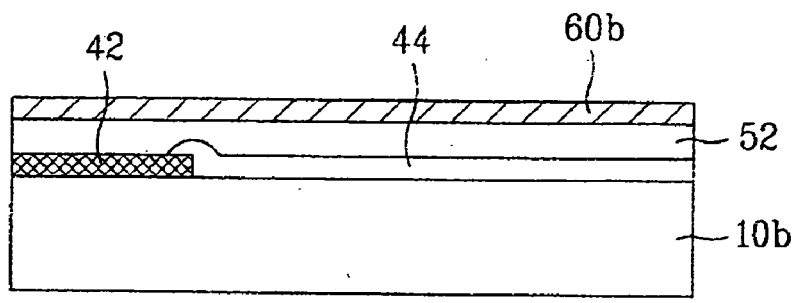
Figure 4A:
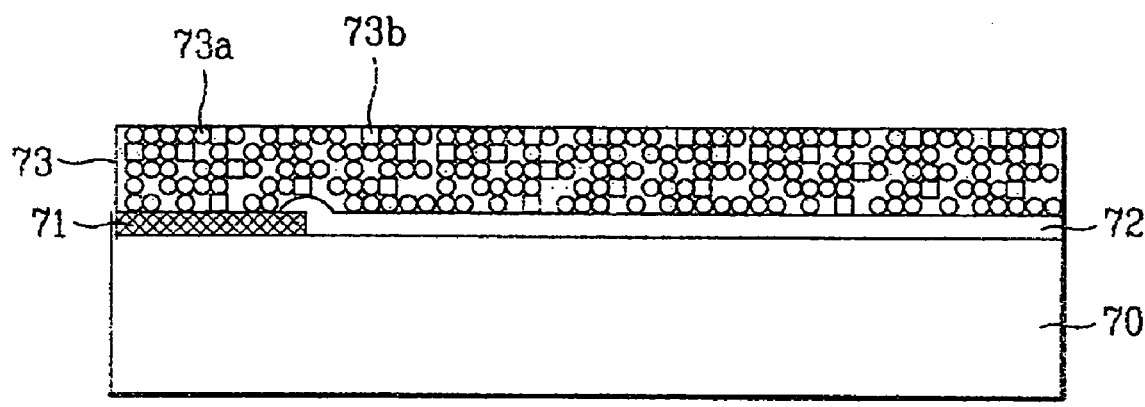
FIGS. 4A to 4C illustrate a process of fabricating an IPS mode LCD device according to principles of the present invention.
Figure 4B:
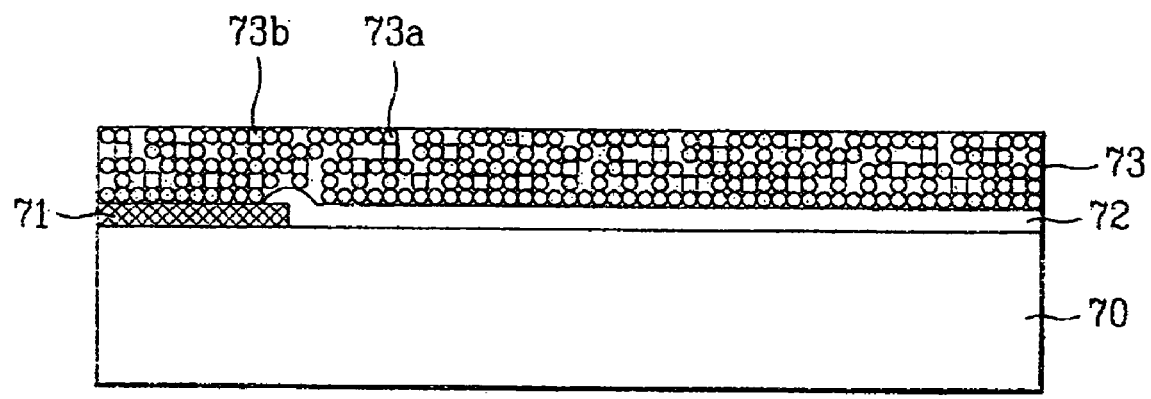
Figure 4C:
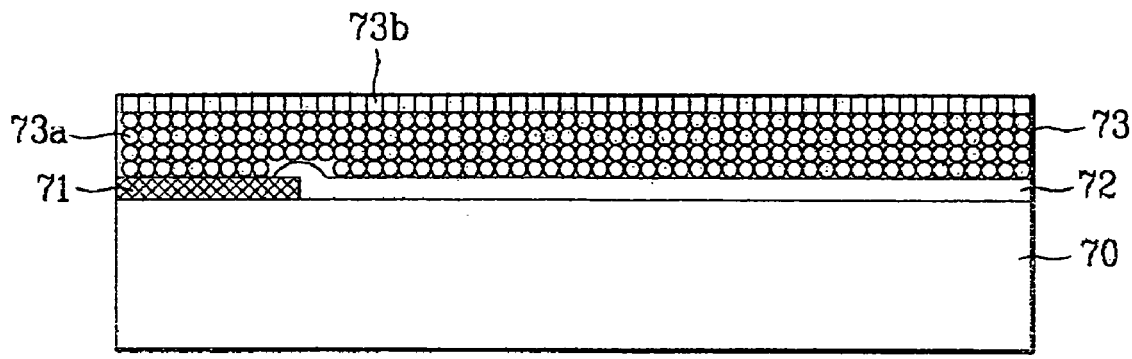
Figure 5:
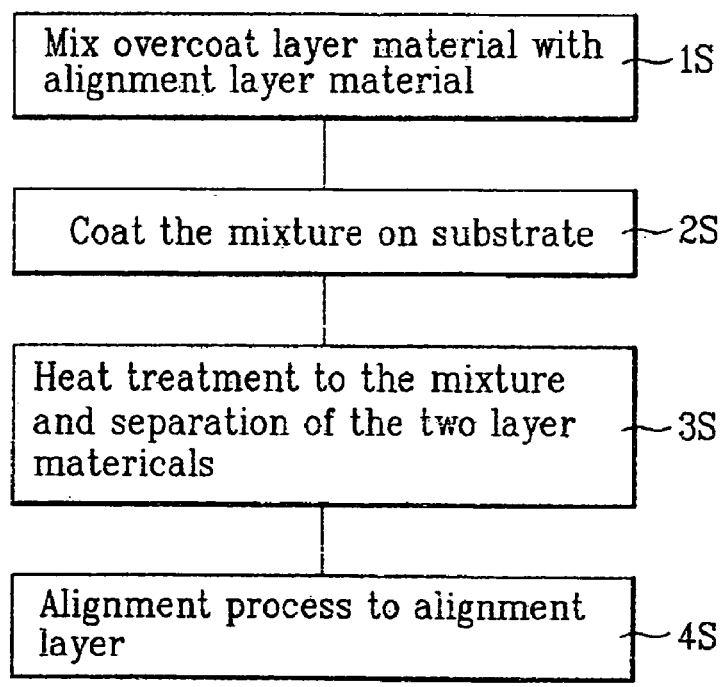
FIG. 5 illustrates a flow chart of the process of fabricating an IPS mode LCD device according to principles of the present invention.

FIGS. 4A to 4C illustrate a process of fabricating an IPS mode LCD device according to principles of the present invention. FIG. 5 illustrates a flow chart of the process of fabricating an IPS mode LCD device according to principles of the present invention.

Referring to FIG. 4A, a substrate 70 having a color filter layer 72 and a black matrix layer 71 may be prepared and cleaned to remove foreign materials from the surface thereof. After the cleaning, a mixture 73 containing a predetermined ratio of material suitable for forming an overcoat layer (i.e., overcoat layer material 73a) to material suitable for forming an alignment layer (i.e., alignment layer material 73b) may be prepared (see S1 of FIG. 5) and coated (e.g., via a spin coating method) over to the surface of the substrate 70, including the color filter layer 72 and the black matrix layer 71 (see S2 of FIG. 5).

In one aspect of the present invention, the mixture 73 may be prepared by mixing solvents of the alignment layer material 73b and solvents of the overcoat layer material 73a together. According to principles of the present invention, the density of the overcoat layer material 73a may be greater than the density of the alignment layer material 73b. In one aspect of the present invention, the mixture 73 may, for example, contain more overcoat layer material 73a than alignment layer material 73b. For example, about 1% to about 10% of the mixture 73 may consist of the alignment layer material 73b. Accordingly, the mixture 73 may produce an overcoat layer that is thicker than the alignment layer. In one aspect of the present invention, the mixture 73 may produce an overcoat layer that is thick enough to substantially planarize the topography of the color filter layer 72 and prevent pigment within the color filter layer 72 from diffusing into a subsequently provided liquid crystal layer.

In one aspect of the present invention, the alignment layer material 73b may, for example, include at least one of a polymer material such as polyamide, polyimide compound, PVA(Polyvinyl Alcohol) or polyamic acid, or a photosensitive material such as PVCH(PolyvinylCinnamate), PSCN (PolysiloxaneCinnamate) or CelCN(CelluloseCinnmate)-based compound, or the like. For example, the alignment layer material 73b may be formed by adding amide-based polar solvent of 5%, such as NMP(N-Metal-2-pyrrolidone), to polyamic acid, wherein the polyamic acid may be obtained by reacting a compound of acid anhydride and diamine with a solvent.

In one aspect of the present invention, the overcoat layer material 73a may, for example, include at least one of a photosensitive resin, an acrylic resin, or the like. For example, the overcoat layer material 73a may be formed by adding NMP material to a photosensitive resin, an acrylic resin, or the like.

Referring to FIG. 4B, upon initially being coated onto the substrate 70, the overcoat layer material 73a may begin to separate from the alignment layer material 73b due to the difference in density between the overcoat layer material 73a and the alignment layer material 73b. Accordingly, the overcoat layer material 73a, having the higher density, may sink toward the color filter layer 72 and the black matrix layer 71 while the alignment layer material 73b, having the lower density, may float away from the color filter layer 72, thereby forming separate layers.

Referring to FIG. 4C, after the mixture 73 is coated, the mixture 73 may be cured (see S3 in FIG. 5). Curing the mixture 73 may increase the rate at which the overcoat layer material 73a separates from the alignment layer material 73b. In one aspect of the present invention, the curing may comprise exposing the coated mixture 73 to heat in a heat treatment. In another aspect of the present invention, the curing may further comprise irradiating the heat treated mixture 73 with light (e.g., ultraviolet light). As a result, an overcoat layer, formed of the overcoat layer material 73a, and an alignment layer, formed of the alignment layer material 73b may beneficially be formed substantially simultaneously. Moreover, the resultant overcoat and alignment layers may be strongly adhered to each other, thereby increasing the reliability of the resultant LCD device.

After the overcoat material 73a and alignment layer material 73b have substantially separated from within the mixture 73, the alignment layer, formed of the alignment layer material 73b, may be treated (e.g., rubbed, irradiated with light, etc.) to effect a predetermined alignment of liquid crystal molecules within a subsequently provided liquid crystal layer. For example, if the alignment layer material 73b of the alignment layer includes a polyamide, a polyamic compound, PVA(Polyvinyl Alcohol), polyamic acid, or the like, the treatment may include a rubbing treatment. If, however, the alignment layer material 73b of the alignment layer includes a photosensitive material such as PVCH (PolyvinylCinnamate), PSCN(PolysiloxaneCinnamate), a CelCN(CelluloseCinnmate)-based compound, or the like, the treatment may, for example, include an ultraviolet irradiation treatment.

As described above, the principles of the present invention are advantageous in the fabrication of LCD devices (e.g., IPS mode LCD devices) because the overcoat layer and the alignment layer may be substantially simultaneously fabricated from a single overcoat layer/alignment layer material mixture. Because the two layers are fabricated substantially simultaneously, the amount of time and cost to fabricate the LCD device may be reduced. Additionally, the overcoat layer/alignment layer material mixture may be coated over the substrate with a spin coating device traditionally used in forming the related art overcoat layer. Accordingly, the alignment layer need not be formed using a separate coating device traditionally used for coating the related art alignment layer, thereby further decreasing the fabrication cost.

By separating overcoat and alignment layer materials from a commonly coated mixture, as opposed to separately forming the overcoat and alignment layers, an overcoat/alignment layer structure having increased adhesive characteristics may be obtained, thereby increasing the reliability of the resultant device.

Moreover, the mixture 73 is coated onto the substrate 70 in a single coating (e.g., spin coating) step. Therefore, once suitably formed according to the principles of the present invention, the individual thicknesses of the overcoat and alignment layers of the present invention may be less than the individual thicknesses of the overcoat and alignment layers formed according to the related art method as described above and may provide an IPS mode LCD device having increased light transmittance characteristics compared to that of the IPS mode LCD device of the related art.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD) device, comprising:
   coating a mixture on a substrate, the mixture including an alignment layer material suitable for forming an alignment layer and an overcoat layer material suitable for forming an overcoat layer;
   partially separating the alignment layer material from the overcoat layer material within the mixture by the density difference between the overcoat layer material and the alignment layer material; and
   forming the alignment layer and the overcoat layer in a stack structure on the substrate by further separating the alignment layer material from the overcoat layer material in a thermal curing treatment.

2. The method of claim 1, further comprising irradiating the mixture with UV light.

3. The method of claim 1, wherein the density of the alignment layer material is less than the density of the overcoat layer material.

4. The method of claim 1, wherein the alignment layer material includes one of polyamide, polyimide-based compound, PVA, polyamic acid, PVCH, PSCN, and a CelCN-based compound.

5. The method of claim 1, wherein the overcoat layer material includes one of a photosensitive resin and a acrylic resin.

6. The method of claim 1, wherein the mixture contains more of the overcoat layer material than the alignment layer material.

7. The method of claim 6, wherein the mixture contains between about 1% and about 10% of the alignment layer material.

8. The method of claim 1, wherein the coating includes spin coating the mixture on the substrate.

9. The method of claim 1, further comprising, prior to the coating, forming at least one color filter layer on the substrate.

10. The method of claim 1, further comprising, prior to the coating, forming a black matrix layer on the substrate.

11. The method of claim 1, further comprising performing an aligning treatment on the alignment layer.

12. The method claimed in claim 11, wherein the aligning treatment includes rubbing the alignment layer.

13. The method claimed in claim 11, wherein the aligning treatment includes irradiating the alignment layer with light.

* * * * *